March 31, 1964   H. B. HUNTRESS   3,126,983
FRICTION COUPLES
Original Filed Aug. 7, 1959   3 Sheets-Sheet 1
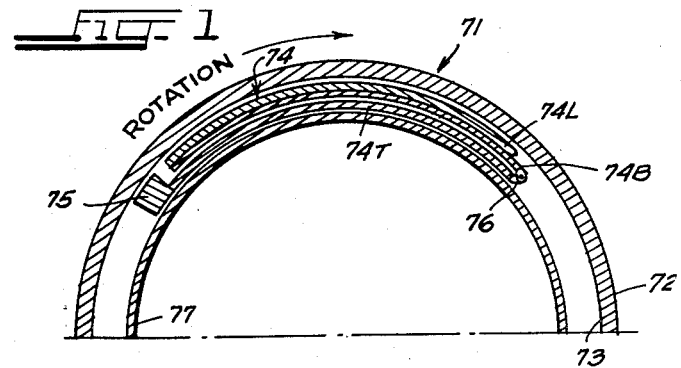
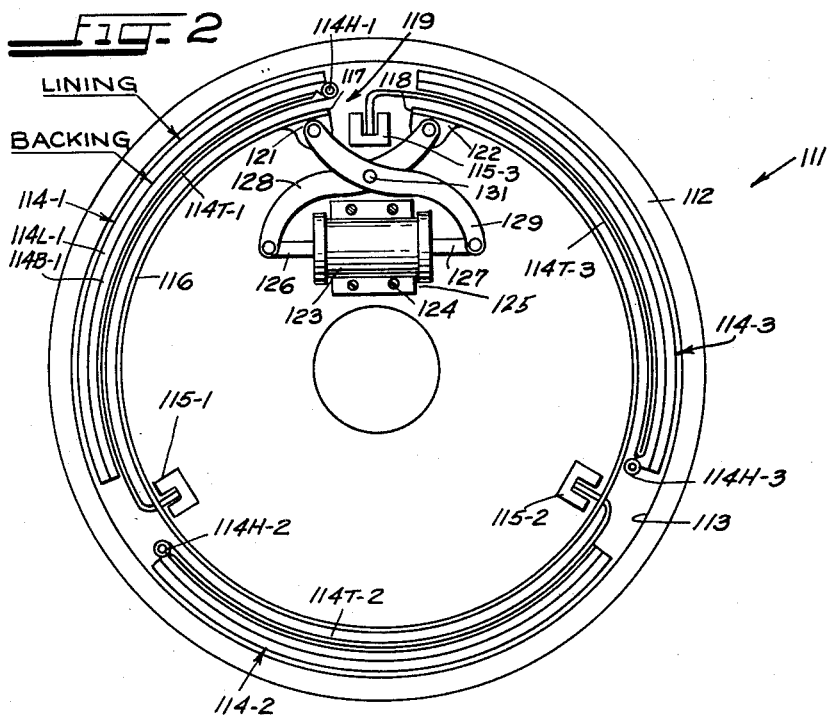
INVENTOR.
HOWARD B. HUNTRESS March 31, 1964  H. B. HUNTRESS  3,126,983
FRICTION COUPLES Original Filed Aug. 7, 1959  3 Sheets-Sheet 2

INVENTOR.
HOWARD B. HUNTRESS

March 31, 1964 H. B. HUNTRESS 3,126,983
FRICTION COUPLES

Original Filed Aug. 7, 1959 3 Sheets-Sheet 3

INVENTOR.
HOWARD B. HUNTRESS
BY
*Wallace Kinger and Doros*
ATTORNEYS

United States Patent Office 3,126,983
Patented Mar. 31, 1964

3,126,983
FRICTION COUPLES
Howard B. Huntress, Suffern, N.Y., assignor to American Brake Shoe Company, New York, N.Y., a corporation of Delaware
Original application Aug. 7, 1959, Ser. No. 832,192, now Patent No. 3,066,765, dated Dec. 4, 1962. Divided and this application May 23, 1962, Ser. No. 197,098
6 Claims. (Cl. 188—78)

This application is a division of application Serial No. 832,192 filed August 7, 1959, now Patent No. 3,066,765.

This invention relates to friction couples such as brakes or clutches which incorporate a rotatable drum and one or more torque shoes engageable with a cylindrical surface of the drum to transmit torque between the drum and the shoe. More specifically, this invention relates to novel arrangements for exerting pressure forces on such torque shoes to engage the torque shoes in frictional contact with a cylindrical surface of the rotating drum.

Heretofore it has been conventional practice in brake and clutch constructions to utilize relatively inflexible torque shoes which have generally been reinforced against flexing by stiffening webs, and to press such torque shoes against a rotating drum by applying a force to an end of one shoe by means of a hydraulic cylinder and to provide an anchor at an opposite end of the shoe for anchoring the shoe against the circumferential movement with the drum. It has also been conventional practice in such constructions to link together a pair of torque shoes at adjacent ends whereby a single cylinder may be utilized for applying an actuating force at a free or opposite end of a first shoe in the pair and whereby a single anchor may be located at the adjacent free end of a second shoe in the pair to receive friction forces developed along the surfaces of both of the shoes of the pair. In the latter arrangement, the frictional force developed along the surface of the first shoe is transmitted to an end of the second shoe as an actuating force.

Under the present invention, a highly flexible shoe is used to construct a friction couple for reasons to be explained, and the shoe may be engaged with the drum by a flexible element disposed in adjacent relation to the non-drum engaging surface of the shoe to transmit a continuous actuating force along the length of the shoe upon flexing of the element. The present invention also comprehends friction couples which utilize a flexible shoe or shoes and multiple flexible elements acting on a single shoe in a manner such that at least one of the flexible elements is flexed by transmission of torque through the friction couple to add to or subtract from the actuating force applied to the shoe by another of the flexible elements. The foregoing will be more completely described with reference to the drawings hereinafter.

One of the primary objects of this invention is to engage at least one flexible torque shoe in frictional contact with a rotating circumferential surface of a drum member by applying in a novel manner a continuous pressure force along the entire length of such a torque shoe; and another object of this invention is to utilize in the construction of a friction couple a novel, flexible band actuator disposed either radially outwardly of torque shoes which are disposed along an outer circumferential surface of a rotatable drum, or radially inwardly of torque shoes which are disposed along an inner circumferential surface of a rotatable drum, and to contract or expand such a band to engage the torque shoes and move the same into frictional contact with the drum.

It is an object of this invention to incorporate in a friction couple of the type which includes at least one flexible torque shoe disposed adjacent a cylindrical surface of a rotatable drum, a flexible member which is connected at opposite ends to an end of the torque shoe and a fixed anchor respectively in a manner such that the intermediate portion of the member extends along the length of the torque shoe in a folded-back relation whereby frictional contact of the shoe with the rotating drum develops either a tension or compression force in the flexible member to move the flexible member into or our of pressure engagement with the shoe.

It is another object of this invention to incorporate in a friction couple of the type which includes a rotatable, cylindrical surfaced drum, a band actuator and to provide torque shoes with flexible members each connected at opposite ends to an end of a shoe and a fixed anchor in a manner such that a flexible member is disposed between a shoe and the band whereby a force developed at the anchor of a torque shoe acts to flex the extension either in tension or compression to vary the actuating force transmitted to the torque shoe through the flexible member.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a schematic, half-section, elevation view of a friction couple which incorporates a torque shoe having an extension disposed in folded-back relation with the torque shoe;

FIG. 2 is an elevation view of a friction couple constructed in accordance with this invention which incorporates torque shoes having flexible members disposed in folded-back relation with the torque shoes and incorporates also a flexible band actuator;

FIG. 3 is an elevation view of a friction couple of the external contracting type which incorporates torque shoes having flexible members and a flexible band actuator.

Figure 4:
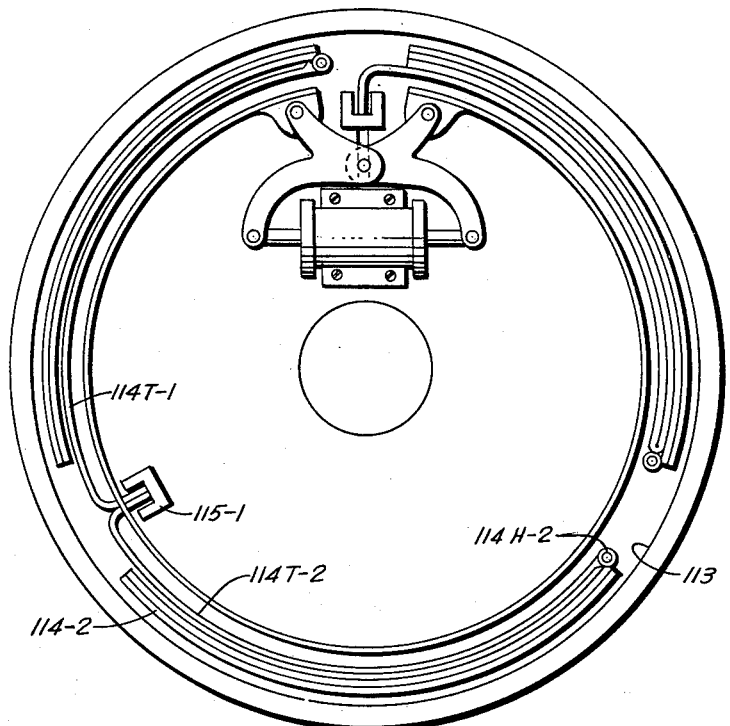
FIGS. 4 and 5 are respectively elevation views similar to FIG. 2 but illustrating modified forms of the friction couple of FIG. 2.

In FIG. 1 a friction couple is designated generally by the reference numeral 71. The friction couple comprises an outer rotatable drum 72 having an inner cylindrical surface 73. An arcuate-shaped torque shoe 74 is disposed in adjacent spaced relation with a portion of the cylindrical surface 73. The torque shoe includes a lining 74L and a flexible, thin-section backing plate 74B.

An anchor 75 is stationarily affixed to suitable structure and a flexible tail 74T is flexibly connected at one end by means of a hinge 76 to one end of the torque shoe and is connected at an opposite end to the anchor 75. The portion intermediate the ends of the tail is bowed and extends along the radially inner surface of the torque shoe. The hinge connection 76 permits some relative movement in a radial direction between the torque shoe and the tail but substantially prevents any tangential movement therebetween.

A flexible actuating band 77 is disposed radially inwardly of the flexible tail 74T, and may preferably be of a cylindrical configuration. Thus, the disposition of the flexible tail is such that an actuating force initiated by the band 77 must be transmitted through the tail 74T before being received by the shoe 74.

In the operation of the friction couple illustrated in FIG. 1, the band 77 is expanded and flexed radially outwardly into a continuous pressure transmitting engagement with the flexible tail 74T. The band 77 moves the tail 74T radially outwardly and into continuous pressure transmitting engagement with the flexible backing 74B of the torque shoe to engage the lining surface of the torque shoe with the cylindrical surface 73 of the rotating drum.

Assuming a clockwise direction of rotation of the drum as indicated by the arrow in FIG. 1, a frictional force is developed on the lining surface of the shoe which tends to shift the shoe circumferentially in a clockwise direction with the rotating drum. This circumferential movement of the shoe is restrained by the tail 74T which is connected to the leading end of the shoe and the anchor 75. Thus, a tension force is developed in the tail 74T, and this tension force acts throughout the length of the tail to straighten the tail by flexing the tail radially inwardly. However, the actuating force of the band 77 resists such inward flexing of the tail. Thus, the frictional force developed on the shoe 74 acts as a tension force in the tail 74T in a negative or degenerative manner to decrease the magnitude of the actuating force transmitted from the band 77 to the shoe 74.

This arrangement of the flexible tail 74T and the negative action of the tail with the clockwise direction of rotation of the drum as indicated in FIG. 1 has a beneficial effect in that increasing friction has a less powerful effect on increasing the torque transmitting effectiveness of the friction couple than in arrangements which do not provide such negative or degenerative action. Thus, materials having relatively high coefficients of friction may be utilized in applications where it is desirable to adapt the arrangement llustrated in FIG. 1 for operation as a brake. That is, materials which have a coefficient of friction likely to cause lock-up in conventional braking arrangements can be employed to provide a well-controlled braking action in the arrangement illustrated in FIG. 1 due to the negative action of the tail.

In FIG. 2 there is illustrated in full elevation an embodiment of this invention wherein the flexible tails are utilized in a manner to produce more uniform torque transmitting effectiveness for both directions of rotation of the drum. Referring to FIG. 2, a friction couple is indicated by the reference numeral 111 and comprises an outer rotatable drum 112 having an inner cylindrical surface 113. A plurality of torque shoes, in this case three in number, are denoted by the reference numbers 114–1, 114–2, and 114–3, and are annularly arrayed along the cylindrical surface 113.

Each torque shoe includes a lining 114L and a flexible backing plate 114B. Each torque shoe is further provided with a flexible tail 114T which has one end connected by means of a hinge 114H to an end of the torque shoe and is disposed in folded-back relation with the torque shoe and is attached at its opposite end to an anchor 115.

A flexible band 116 extends circumferentially along the inner surfaces of the flexible tails 114T and is slotted in the areas adjacent the first and second anchors 115–1 and 115–2 to permit the ends of the flexible tails 114T–2 to be passed therethrough. End portions 117 and 118 of the band 116 are spaced apart to provide a gap 119 therebetween. The end portions 117 and 118 are provided with radially inwardly directed lugs 121 and 122.

An expansion cylinder 123 is mounted by means of screws 124 to a non-rotatable back plate 125 and includes piston rods 126 and 127 which extend axially outwardly from opposite ends of the cylinder 123. A pair of levers 128 and 129 are connected at opposite ends to one of the lugs and one of the piston rods so as to be disposed in overlying, crossed relation as viewed in FIG. 2. The levers are pivotally pinned together at point 131.

The operation of the embodiment of the invention illustrated in FIG. 2 is basically the same as that described in relation to the arrangement illustrated in FIG. 1. Upon actuation of the piston rods 126 and 127 outwardly of the cylinder 123 the band 116 is flexed into engagement with the tails 114T which, in turn, engage the flexible backing plates 114B to move the torque shoes into frictional contact with the cylindrical surface 123.

Assuming a clockwise direction of rotation of the drum as viewed in FIG. 2, the tails 114T are placed in tension to counteract the compressive force developed in the band 116. With rotation of the drum 112 in an opposite, counterclockwise direction the frictional forces developed on the lining surface of the torque shoes are transmitted through the flexible tails 114T to the anchors 115 as a compressive force which adds to the actuating force supplied by the flexible band 116. Thus, the friction couple 111 acts in a positive or regenerative manner with a counterclockwise direction of the rotation of the drum.

With the arrangement illustrated in FIG. 2, wherein each torque shoe and tail assembly is substantially independent of an adjacent torque shoe and tail assembly, the hinge and anchor connections of various ones of the flexible tails can conveniently be reversed from that illustrated in FIG. 2 so that selected flexible tails 114T will act in a negative manner while others act in a positive manner. A friction couple incorporating such a reversal is illustrated in FIG. 4, being a modification of the friction couple illustrated in FIG. 2, to the extent that the torque shoe 114–2 is reversed in comparison to FIG. 2, so that the hinge 114H–2 thereof is adjacent the hinge 114H–3 of the torque shoe 114–3. The flexible tail 114T–2 of the shoe 114–2 has the angled end thereof related to the angle 115–1, and consequently the angle 115–2, FIG. 2, can be omitted. Thus, by suitable selection of the number of flexible tails that are to act in one sense as compared to the number that are to act in an opposite sense, as will be apparent from the modification illustrated in FIG. 4, a friction couple can be provided which provides a desired ratio of effectiveness in one direction of rotation to the effectiveness in opposite direction of rotation.

While the friction couples so far described have been of the internal expanding type, the principles of this invention are equally applicable to an external contracting type friction couple. FIG. 3 illustrates an arrangement wherein a flexible band actuator and flexible folded-back tails are incorporated in a friction couple having torque shoes movable radially inwardly into engagement with a cylindrical surface of an inner rotating drum.

In FIG. 3 a friction couple of the external contracting type is designated generally by the reference numeral 141 and includes an inner rotatable drum 142 having an external cylindrical surface 143. A plurality of torque shoes 144–1, 144–2, and 144–3 are annularly arrayed along the cylindrical surface 143. Each of the torque shoes 144 includes a lining 144–L and an outer backing plate 144B.

Each of the torque shoes is provided with a flexible tail 144T which has one end connected by a hinge 144H to an end of the torque shoe. The opposite end of each tail 144T is connected to an anchor 145 which is fixed to some torque receiving structure.

Each of the tails 144T has a portion intermediate the ends disposed in closely adjacent relation with the backing plates 144B. The anchors 145 are aligned with the spacing between adjacent shoes and disposed radially outwardly thereof. A flexible band 146 encircles the torque shoes 144 and is spaced radially outwardly of the tails 144T. The band 146 is provided with slots in the areas adjacent anchors 145–1 and 145–2 and tapered down portions of the flexible tails 144T–1 and 144T–2 are passed therethrough.

The band has spaced apart end portions 147 and 148 which provide a gap 149 in the cylindrical surface formed by the band. The free end of the tail 144T–3 is passed through this gap and attached to the anchor 145–3.

Radially outwardly projecting lugs 151 and 152 are provided at the respective end portions 147 and 148.

An expansion cylinder 153 is mounted on some suitable non-rotatable structure radially outwardly of the gap 149. The cylinder 153 includes piston rods 154 and 155 which project axially outwardly of the opposite ends of the cylinder. A first lever 156 is pivotally connected at opposite ends to the piston rod 154 and the lug 151. A second lever is pivotally connected at its opposite ends to the piston rod 155 and the lug 152. A tie member 158 extends between and is pinned at its opposite ends to levers 156 and 157 so that the levers are pivotal about the pinned connections to the tie member 158 whereby expansion of the piston rods 154 and 155 axially outwardly of the piston 153 reduces the size of the gap 149 by pulling the ends 147 and 148 of the band toward one another.

In the operation of the external contracting friction couple illustrated in FIG. 3, the torque shoes are actuated into torque transmitting contact with the drum by a force initiated in the expansion cylinder 153. Expansion of the piston rods outwardly of the cylinder contracts band 146 in tension to transmit a continuous radially inwardly directed pressure force through the tails 144T to the backing of the respective torque shoes. The frictional force developed on the surface of the linings of the torque shoes acts on the tails in a circumferential direction which is dependent upon the direction of rotation of the drum to develop either a compressive or a tension force in the flexible tails.

With the external contracting arrangement illustrated in FIG. 3, clockwise direction of rotation of the drum 142 develops a tension force in the tails which adds to the actuating force supplied by the band 146. With a counterclockwise direction of rotation of the drum 142 the torque transmitted to the torque shoe develops a compressive force in the tail which acts in opposition to the tension force in the band 146 to lessen the actuating force applied to the shoe.

As in the embodiment illustrated in FIG. 2, the arrangement of the hinge and anchor means on various ones of the shoes may be reversed so that the torque transmitting effectiveness for opposite directions of rotation of the drum may be more nearly equalized.

Figure 5:
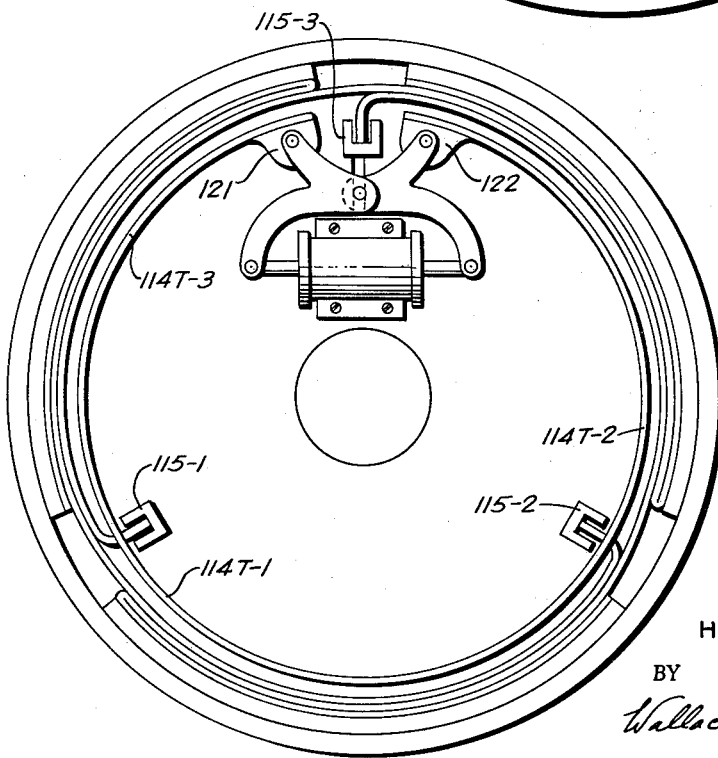

In the embodiments illustrated the length of the tails or extensions have been shown as being substantially the same length as the individual torque shoes, but the tails can be one or more times the length of a shoe so that a single tail can be effective on multiple shoes. A friction couple incorporating this feature of the present invention is illustrated in FIG. 5 which shows a friction couple identical to FIG. 2 except that each of the flexible tail extensions of the torque shoes is of such length as to extend beneath not only the shoe with which it is associated, but also the next adjacent shoe. Thus, as shown in FIG. 5, the extension 114T-1 is extended to the anchor 115-2, rather than being anchored to the anchor 115-1 as illustrated in FIG. 2. In like manner, the extension 114T-2 is lengthed to be anchored to the anchor 115-3, rather than the anchor 115-2. Finally, the extension 114T-3 is extended beyond its related shoe so as to underlie the next adjacent shoe and is anchored to the anchor 115-1.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A friction couple comprising, a rotatable drum having a circumferential surface, a plurality of flexible arcuate shaped torque shoes arrayed along a circumferential surface of the drum in adjacent end-to-end relation and movable in radial and circumferential directions, each shoe having a first surface along the length of the shoe facing the circumferential surface of the drum and a second surface opposite said first surface, anchors for limiting movement of the torque shoes in a circumferential direction, each shoe having a flexible member connected at one end to an end of the torque shoe and connected at an opposite end to an anchor, said flexible member having a portion intermediate said ends disposed in adjacent relation to the second surface of the torque shoe to which the flexible member is connected so that the flexible member extends in folded-back relation along the length of the shoe, and actuating means for engaging each flexible member in pressure contact with the torque shoe to move the torque shoe into frictional contact with the circumferential surface of the drum, whereby the frictional contact of each torque shoe with the drum compresses the extension to bow the extension radially outwardly in one direction of rotation of the drum and tenses the extension to flex the extension radially inwardly with another direction of rotation of the drum to correspondingly vary the force transmitted to the torque shoe through the flexible extension.

2. A friction couple as defined in claim 1 wherein hinge means connect the flexible members to the ends of the torque shoes.

3. A friction couple comprising, a rotatable drum having a circumferential surface, a flexible torque shoe bowed to have one surface of the shoe disposed in adjacent, spaced and facing relation with a circumferential surface of the drum, said torque shoe being movable in a radial direction into and out of engagement with said circumferential surface and being movable in a circumferential direction by frictional engagement with said circumferential surface, a non-rotatable anchor for limiting movement of the torque shoe in a circumferential direction, a flexible member connected at one end to an end of the torque shoe and connected at an opposite end to the anchor, said flexible member being bowed to have a portion disposed in adjacent relation to a surface of the torque shoe opposite that facing the drum, and an actuating means for engaging the flexible member in pressure contact with the torque shoe to move the torque shoe radially into frictional contact with the circumferential surface of the drum, said actuating means comprising a band bowed complementary to the flexible member and engageable with the flexible member and means for varying the curvature of the band to exert a pressure force through the flexible member on the torque shoe to move the torque shoe radially into frictional engagement with the drum, whereby the flexible member is placed in tension by rotation of the drum in one direction and is placed in compression by rotation of the drum in a direction opposite to said one direction.

4. A friction couple comprising, a rotatable drum having an inner circumferential surface, a flexible torque shoe bowed to have a forward surface along the entire arc of the shoe facing the inner circumferential surface of the drum, said torque shoe being movable in a radial direction into and out of engagement with said circumferential surface and being movable in a circumferential direction by frictional engagement with said circumferential surface, a non-rotatable anchor for limiting movement of the torque shoe in a circumferential direction, a flexible member connected at one end to an end of the torque shoe and connected at an opposite end to the anchor, said flexible member having a bowed portion disposed in adjacent relation to a rearward surface of the torque shoe, and an actuating means for engaging the flexible member in pressure contact with the torque shoe to move the torque shoe radially into frictional contact with the circumferential surface of the drum, said actuating means comprising a flexible band disposed radially inwardly of the flexible member and bowed complementary to the flexible member and engageable with the flexible member, said actuating means also comprising expansion means for flexing the band radially outwardly to exert a pressure force through the flexible member on the torque shoe to move the torque shoe radially into frictional engagement with the inner surface of the drum, whereby the flexible member is placed in tension by rotation of the drum in one direction to decrease the radial force transmitted from the band to the torque shoe and is placed in compression by rotation of the drum in a direction opposite to said one direction to increase the radial force transmitted from the band to the torque shoe.

5. A friction couple comprising, a rotatable drum having an outer circumferential surface, a flexible arcuate shaped torque shoe having a first surface along the arc of the shoe facing the outer circumferential surface of the drum, said torque shoe being movable in a radial direction into and out of engagement with said circumferential surface and being movable in a circumferential direction by frictional engagement with said circumferential surface, a non-rotatable anchor for limiting movement of the torque shoe in a circumferential direction, a flexible member connected at one end to an end of the torque shoe and connected at an opposite end to the anchor, said flexible member being arcuately shaped and being disposed radially outwardly of and in adjacent relation to the torque shoe, and an actuating means for engaging the flexible member in pressure contact with the torque shoe to move the torque shoe radially into frictional contact with the circumferential surface of the drum, said actuating means comprising a flexible band disposed radially outwardly of the flexible member and bowed complementary to the flexible member and expansion means for contracting the band to engage the band with the flexible member and exert a radial inward pressure force through the flexible member on the torque shoe to move the torque shoe into frictional engagement with the outer surface of the drum, whereby the flexible member is placed in tension by rotation of the drum in one direction to increase the radial force transmitted from the band to the torque shoe and is placed in compression by rotation of the drum in a direction opposite to said one direction to decrease the radial force transmitted from the band to the torque shoe.

6. A friction couple as herein disclosed having a torque shoe with a folded back extension to be engaged with an anchor as herein disclosed.

References Cited in the file of this patent
UNITED STATES PATENTS

| | | |
|---|---|---|
| 2,868,337 | Holl | Jan. 13, 1959 |
| 2,992,706 | Huntress | July 18, 1961 |
| 3,066,765 | Huntress | Dec. 4, 1962 |